Figure 1:
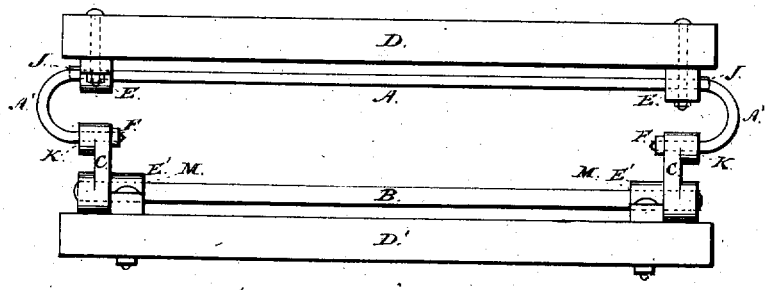

C. W. SALADEE.

Car-Springs for Vehicles.

No. 5,359. Reissued April 15, 1873.

Attest,
Edm. F. Brown.
R. P. Anderson

Inventor,

UNITED STATES PATENT OFFICE.

CYRUS W. SALADEE, OF ST. CATHARINE'S, CANADA, ASSIGNOR OF ONE-HALF INTEREST TO LEANDER DOBBINS, OF ERIE, PENNSYLVANIA.

IMPROVEMENT IN SPRINGS FOR VEHICLES.

Specification forming part of Letters Patent No. 132,693, dated October 29, 1872; reissue No. 5,359, dated April 15, 1873; application filed April 1, 1873.

*To all whom it may concern:*

Be it known that I, CYRUS W. SALADEE, of St. Catharine's, in the Dominion of Canada, have invented certain Improvements in Springs and their Connections for Railway Cars and Wheeled Vehicles generally, of which the following is a specification embodying my invention.

*Nature and Object.*

The first part of my invention has for its object the complete equalization of torsional springs employed in railway-car trucks and other vehicles by means or one or more equalizing shafts so applied and operated in connection with the springs as to compel them to act in unison each with the other, and so as to prevent side motion when more of the load is on one side than the other, and at the same time prevent undue strain upon any one or more of the springs employed. The second part of my invention has for its object the attainment of a greater degree of vibrating motion to the body of the vehicle, as hereinafter more particularly described.

*The Drawing.*

Figure 4:
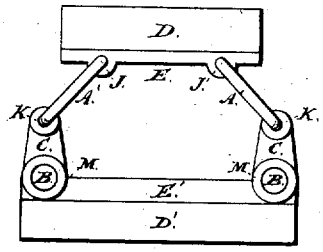
Figure 2:
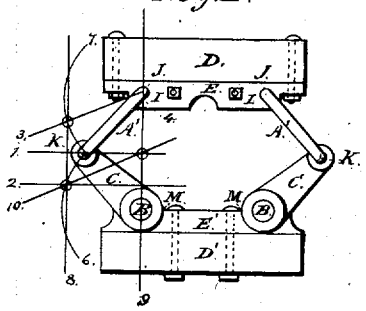
Figure 3:
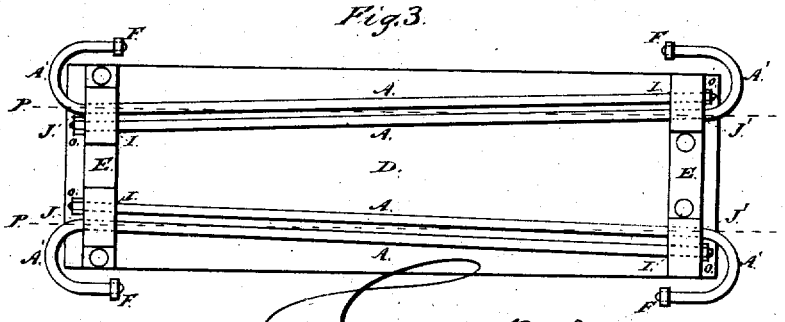

Figure 1 is a front elevation. Fig. 2 is an end view of Fig. 1. Fig. 3 is a bottom view of the bed-plate D, showing the arrangement of the springs; and Fig. 4 is likewise an end view of Fig. 1, of another modification, showing a different position of the cranks C than seen in Fig. 2, otherwise the same.

On the lower bed-plate D′ are secured two equalizing-shafts, B, a side view of which is had in Fig. 1, and the ends are shown in Fig. 2. These shafts B are held in their bearings M, so as to allow them to oscillate freely when actuated by the cranks C, which are rigidly secured to their outer ends. On the under surface of the bed-plate D is arranged, in pairs or sets, the springs A, as clearly shown in Fig. 3. Said springs are provided with lever ends or cranks A′ formed upon their outer ends by a bend of the steel of which the springs are composed, the outer ends of which hinge into the ends of the cranks C at K, and where they are allowed to freely work with the movement of the springs. The opposite ends of the springs are rigidly held in their bearings at I, while the crank-ends are allowed free play in the bearings J and J′, and so arranged that the opposite loose bearings J and J′ are on a line, P, and parallel with the edges of the bed-plate D, as is clearly shown in Fig. 3, without further explanation.

It will be readily understood by those skilled in the construction of car-trucks that the arrangement of equalizing-shafts here shown and described is equally applicable and useful in connection with any railway-car truck.

*Claims.*

I claim as my invention—

1. In combination with bolster D and bed-plate D′ of a railway-car truck, springs A A with the equalizing-shafts B B, the latter carrying on their opposite ends the cranks C C, all substantially as and for the purpose set forth.

2. In combination with the lever-ends of the torsional springs, cranks C, arranged and operating substantially as and for the purpose set forth.

3. The arrangement of torsional springs A in pairs, so that the bearings J and J′ shall be on a parallel line with each other and with the edges of the bed-plate, as and for the purpose set forth.

CYRUS W. SALADEE.

Witnesses:

EDM. F. BROWN,

R. P. ANDERSON.